United States Patent
Uchibori

(10) Patent No.: US 9,900,266 B2
(45) Date of Patent: Feb. 20, 2018

(54) SEMICONDUCTOR CHIP, INTEGRATED CIRCUIT, AND DATA TRANSFER METHOD

(71) Applicant: NEC Corporation, Minato-ku, Tokyo (JP)

(72) Inventor: Shusaku Uchibori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 101 days.

(21) Appl. No.: 15/019,027

(22) Filed: Feb. 9, 2016

(65) Prior Publication Data
US 2016/0269320 A1  Sep. 15, 2016

(30) Foreign Application Priority Data
Mar. 10, 2015  (JP) ................. 2015-047050

(51) Int. Cl.
*H04L 12/933* (2013.01)
*H04L 12/875* (2013.01)

(52) U.S. Cl.
CPC ............ *H04L 49/109* (2013.01); *H04L 47/56* (2013.01)

(58) Field of Classification Search
CPC ...... H04W 72/08; H04W 72/04; H04W 72/12
See application file for complete search history.

(56) References Cited

U.S. PATENT DOCUMENTS 6,674,720 B1 * 1/2004 Passint .................... H04L 45/06
370/235
2015/0052283 A1 * 2/2015 Ishii .................... G06F 13/1621
710/309

FOREIGN PATENT DOCUMENTS

| JP | 2009-110512 A | 5/2009 |
|----|---------------|--------|
| JP | 2012-182807 A | 9/2012 |
| JP | 2012-239138 A | 12/2012 |
| JP | 2013-021452 | 1/2013 |
| WO | 2014/128802 A1 | 8/2014 |

OTHER PUBLICATIONS

Japanese Office Action for JP Application No. 2015-047050 dated Jan. 26, 2016 with English Translation.

* cited by examiner

*Primary Examiner* — Lakeram Jangbahadur

(57) ABSTRACT

A semiconductor chip includes modules configured to transmit transfer data, the transfer data including a lifetime corresponding to a time required to transfer the transfer data, routers including a plurality of input/output controller configured to receive and transmit the transfer data, the routers being configured to add a predetermined value to the lifetimes included in deferred transfer data, transmission of the deferred transfer data being deferred as a result of arbitration for transmitting the transfer data having a largest lifetime among a plurality of the transfer data competing for one of the input/output controller. and channels configured to connect one of the modules to one of the routers, or to connect one of the routers to an adjacent router.

7 Claims, 10 Drawing Sheets

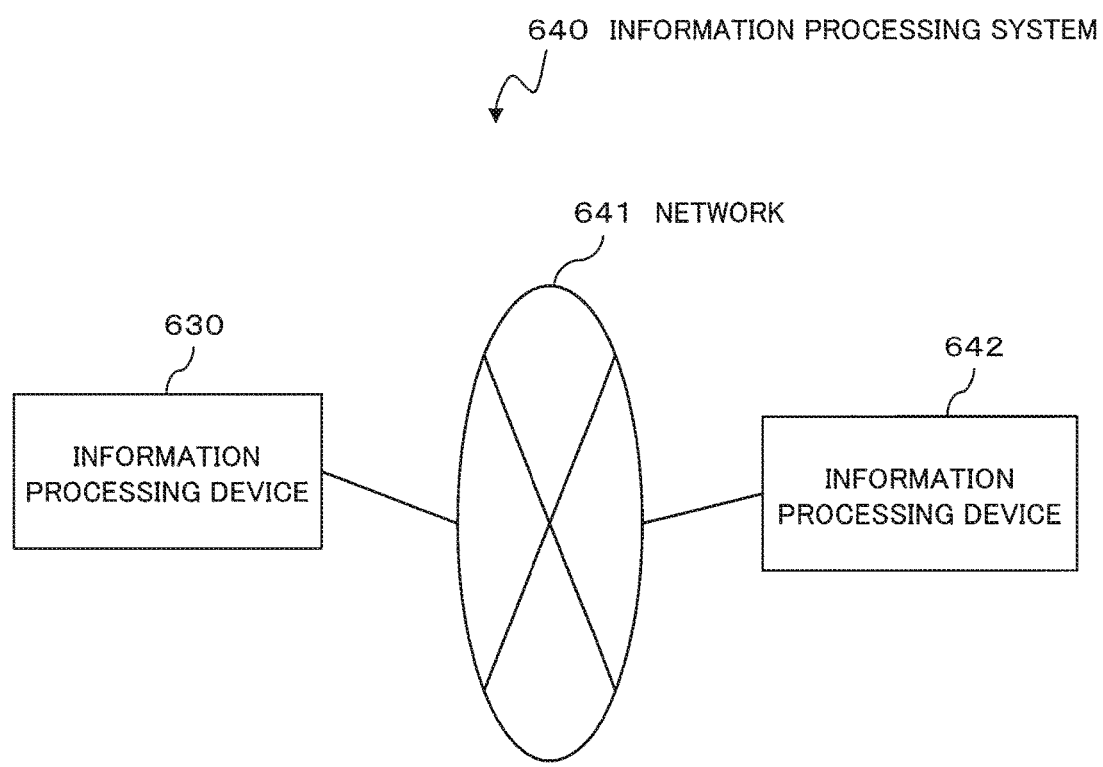

SEMICONDUCTOR CHIP, INTEGRATED CIRCUIT, AND DATA TRANSFER METHOD

This application is based upon and claims the benefit of priority from Japanese Patent Application No. 2015-047050, filed on Mar. 10, 2015, the disclosure of which is incorporated herein in its entirety by reference.

TECHNICAL FIELD

The present invention relates to a semiconductor chip that uses network-on-chip architecture, an integrated circuit on which the semiconductor chip is mounted, and a data transfer method in the semiconductor chip.

BACKGROUND ART

Various technologies have been disclosed which control the order of priority in packet transfer in communication networks.

Japanese Patent Application Laid-open Publication No. 2012-182807 (hereinafter referred to as "PTL1") discloses the following technology regarding scheduling of priorities in communication networks. First, packets with high priority levels (hereinafter, referred to as high priority packets) are placed at points progressively closer to the head of a queue instead of being placed at the end of the queue. Second, the points progressively closer to the head of the queue are determined on the basis of a predetermined percentage of a delay requirement of the high priority packet or a predetermined percentage of an expected queuing delay for the high priority packets.

Japanese Patent Application Laid-open Publication No. 2012-239138 (hereinafter referred to as "PTL2") discloses a priority setting device. The priority setting device acquires a plurality of packets. The transmission nodes and reception nodes of the packets are identical. The priority setting device then sets the priorities of the packets in accordance with inter-packet delays between the packets. For example, the priority setting device calculates first delay amounts, which are statistics of inter-packet delays between the packets, on the basis of acquisition times of the plurality of packets acquired in a predetermined period. The priority setting device then sets the priorities of the packets on the basis of differences between the first delay amounts and a predetermined reference delay amount. The priority setting device also calculates a second delay amount, which is a statistic of the first delay amounts, and employs the second delay amount as the above-described reference delay amount.

On the other hand, in recent LSI (Large Scale Integration) design, a network-on-chip technology in which modules in an LSI chip are interconnected by routers and channels has come to be employed.

For example, Japanese Patent Application Laid-open Publication No. 2009-110512 (hereinafter referred to as "PTL3") discloses an example of a network-on-chip. The network-on-chip disclosed in PTL3 includes integrated processor blocks, routers, memory communication controllers and network interface controllers. In the network-on-chip, first, each integrated processor block is coupled with a router through a memory communication controller and a network interface controller. Second, each memory communication controller controls communication between an integrated processor block and memory. Third, each network interface controller controls inter-integrated processor block communication through routers.

When a plurality of communications (transfers of packets) from a plurality of ports to a specific port compete with one another, a router in such a network-on-chip employs, for example, a round-robin scheduling method to arbitrate the plurality of communications.

SUMMARY

An exemplary object of the invention is to provide a semiconductor chip, an integrated circuit, a card, an information processing device and a data transfer method, which may resolve the problem of deterioration in performance.

A semiconductor chip according to an exemplary aspect of the invention includes modules configured to transmit transfer data, the transfer data including a lifetime corresponding to a time required to transfer the transfer data, routers including a plurality of input/output controller configured to receive and transmit the transfer data, the routers being configured to add a predetermined value to the lifetimes included in deferred transfer data, transmission of the deferred transfer data being deferred as a result of arbitration for transmitting the transfer data having a largest lifetime among a plurality of the transfer data competing for one of the input/output controller, and channels configured to connect one of the modules to one of the routers, or to connect one of the routers to an adjacent router.

An integrated circuit according to an exemplary aspect of the invention includes the semiconductor chip, a package on which the semiconductor chip is mounted, and connection terminals that are connected to the semiconductor chip and extend to the exterior of the package.

A card according to an exemplary aspect of the invention includes the integrated circuit having the semiconductor chip, and a circuit configured to supply power to the integrated circuit.

An information processing device according to an exemplary aspect of the invention includes the card, and a casing configured to contain the card.

A data transfer method according to an exemplary aspect of the invention by which routers including a plurality of input/output controller execute receiving transfer data each of which includes a lifetime that corresponds to a time required to transfer the piece of transfer data, the transfer data having been transmitted by modules, and adding a predetermined value to the lifetimes included in deferred transfer data, transmission of the deferred transfer data being deferred as a result of arbitration for transmitting the transfer data having a largest lifetime among a plurality of transfer data for one of the input/output controller.

BRIEF DESCRIPTION OF THE DRAWINGS

Exemplary features and advantages of the present invention will become apparent from the following detailed description when taken with the accompanying drawings in which:

FIG. 10 is a block diagram illustrating an example of an information processing system that includes the information processing device including the card including the integrated circuit including the LSI chip according to the respective exemplary embodiments.

EXEMPLARY EMBODIMENT

Next, a detailed explanation will be given for a first exemplary embodiment with reference to the drawings. The same components are provided with the same reference signs in respective drawings and respective exemplary embodiments described in the description, and descriptions thereof will be omitted appropriately.

<<<First Exemplary Embodiment>>>

Figure 1:
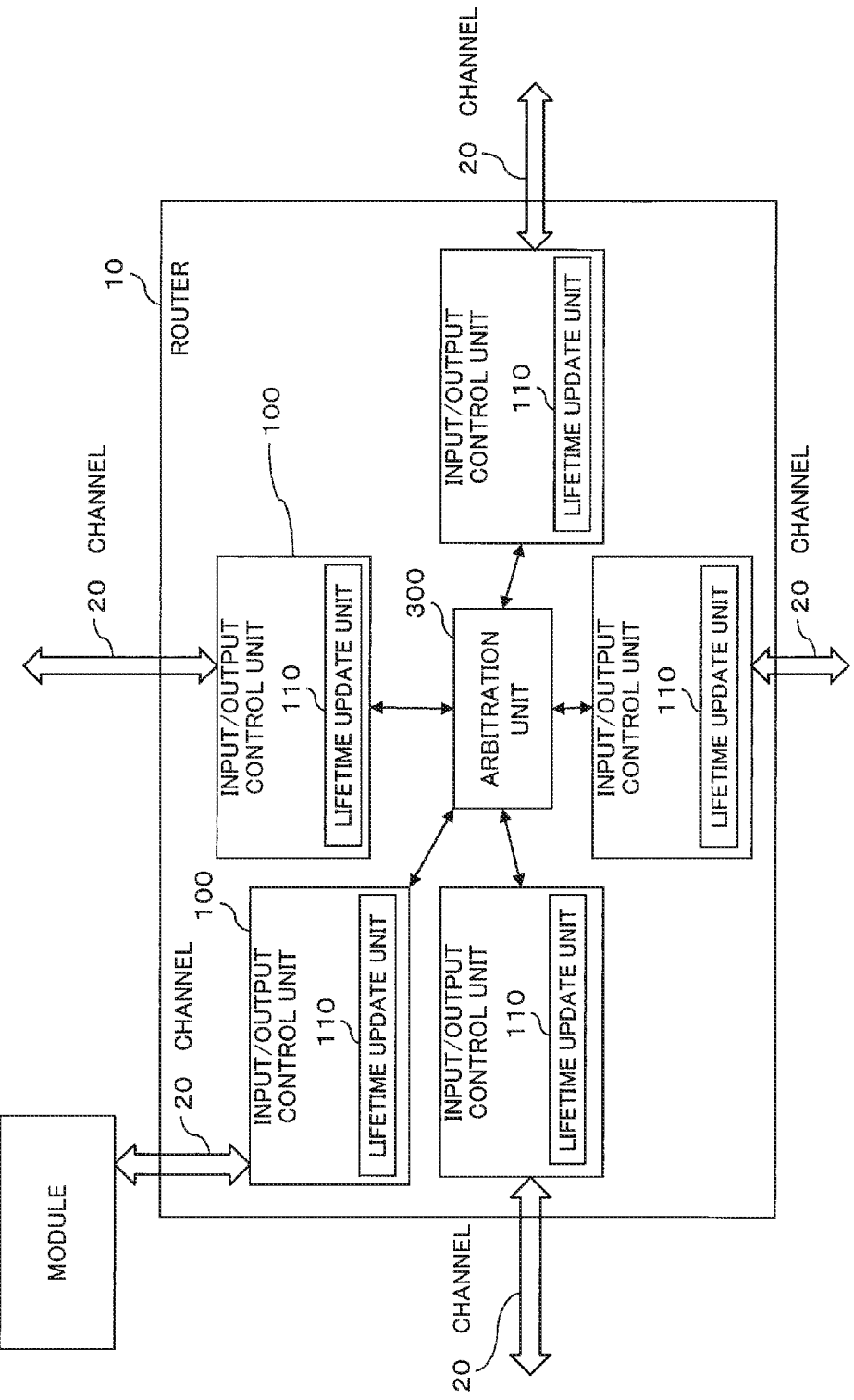
FIG. 1 is a block diagram illustrating a basic configuration of an LSI chip according to a first exemplary embodiment of the present invention.

FIG. 1 is a block diagram illustrating a basic configuration of an LSI chip (also referred to as a semiconductor chip) 30 according to a first exemplary embodiment of the present invention.

Figure 2:
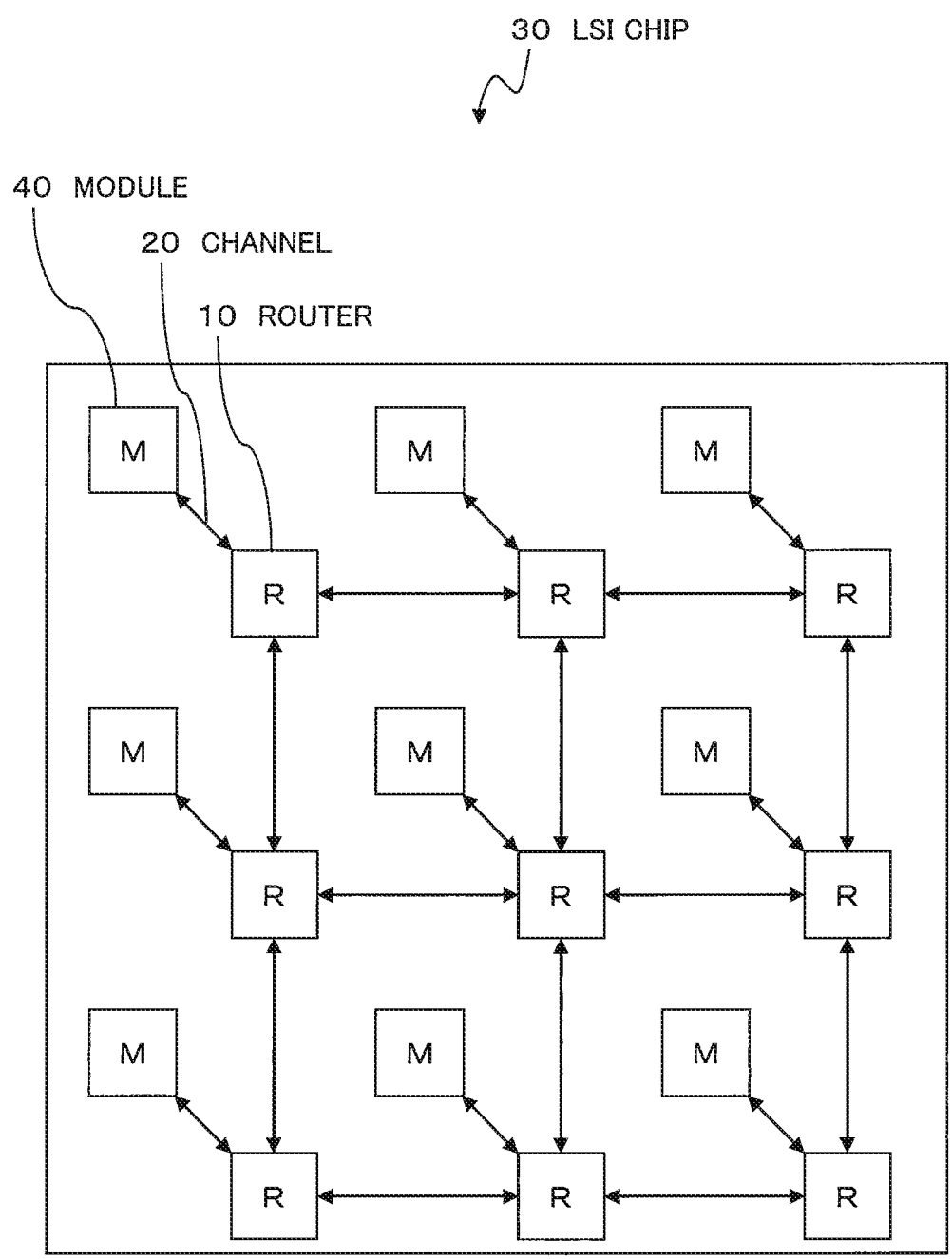
FIG. 2 is a block diagram illustrating an overall configuration of the LSI chip according to the first exemplary embodiment.

FIG. 2 is a block diagram illustrating an overall configuration of the LSI chip 30 according to the first exemplary embodiment of the present invention. In FIG. 2, sign "R" denotes a router, and sign "M" denotes a module.

As illustrated in FIGS. 1 and 2, the LSI chip 30 according to the first exemplary embodiment includes routers 10, modules 40, and channels 20. Regardless of the examples in FIGS. 1 and 2, the numbers of routers 10, modules 40, and channels 20 may be arbitrary numbers.

===Channel 20===

A channel 20 connects a module 40 to a router 10. Another channel 20 connects routers 10 that are adjacent to each other. Each channel 20 is configured with a plurality of wires (not illustrated), for example.

===Module 40===

Each module 40 transmits packets (also referred to as transfer data) 70 each of which includes a lifetime.

A lifetime included in each packet 70 corresponds to a time required to transfer the packet 70. A lifetime corresponds to the number of times of deferment of transmission. The number of times of deferment of transmission is a result of arbitration in a router 10, which will be described later. The greater the number of times of transmission deferment is, the larger the value of a lifetime becomes. Any unit may be used as a unit of lifetime. For example, a lifetime may have no unit and be equal to the number of times of deferment itself. Alternatively, the unit of lifetime may be a nanosecond. In this case, a lifetime may be a value obtained by multiplying the number of times of deferment by a latency time due to a single deferment. The latency time due to a single deferment may be obtained empirically or theoretically.

For example, each module 40 transmits packets 70 the lifetime which includes 0.

Figure 3:
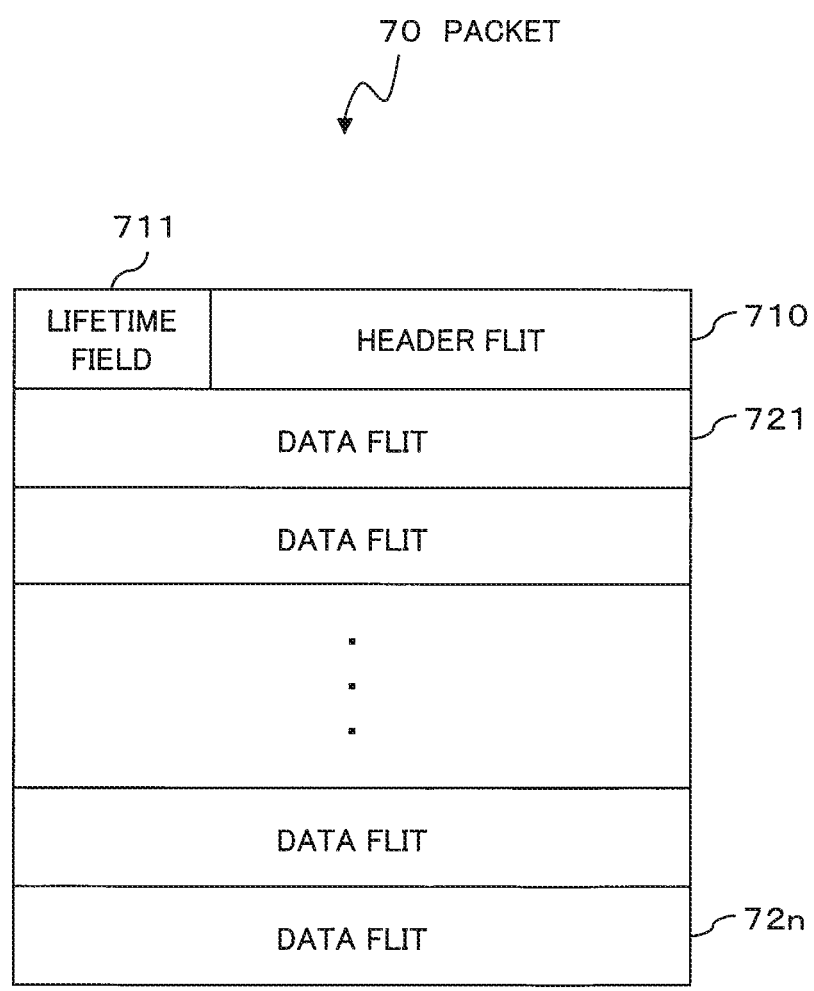
FIG. 3 is a diagram illustrating an example of a structure of a packet in the first exemplary embodiment.

FIG. 3 is a diagram illustrating an example of a structure of a packet 70 in the first exemplary embodiment. As illustrated in FIG. 3, the packet 70 is composed of a header flit 710 including transfer destination information (not illustrated) and a plurality of data flits 720 [721 to 72n (n is a natural number equal to or greater than 1)] including actual transfer data. Further, as illustrated in FIG. 3, the header flit 710 includes a lifetime field 711 where a lifetime is contained.

===Router 10===

Each router 10 adds a predetermined value to lifetime included in packets 70 the transmission of which are deferred as a result of arbitration among a plurality of packets 70 competing for an input/output control unit 100. The plurality of packets 70 competing for an input/output control unit 100 is arbitrated to transmit a packet 70 with the largest lifetime among the plurality of packets 70. The lifetime of the packets 70 which are deferred is a lifetime that is contained in the lifetime field 711 of each of the plurality of packets 70. The predetermined value added to the packets 70 is "1 (indicating a single time of deferment, 1 nanosecond, or the like)", for example. The "plurality of packets 70 competing for an input/output control unit 100" mentioned above indicates that the plurality of packets 70 are to be transmitted to the same input/output control unit 100. That is, the "plurality of packets 70 competing for an input/output control unit 100" indicates that respective ones of a plurality of input/output control units 100 receive packets 70, and input/output control units 100 corresponding to transfer destination information included in the header flits 710 of the packets 70 are identical.

As illustrated in FIG. 1, each router 10 includes a plurality of input/output control units 100 to receive and transmit packets 70. Each router 10 receives packets 70 from a module 40 into an input/output control unit 100 directly or through another router 10 via a channel 20. Each router 10 transmits packets 70 to a module 40 or another router 10 from an input/output control unit 100 via a channel 20.

Each input/output control unit 100 is principally configured with a buffer (not illustrated) composed of registers (not illustrated). Each input/output control unit 100 further includes a lifetime update unit 110.

Each input/output control unit 100 holds received packets 70 in the buffer thereof. At the same time, each input/output control unit 100 transmits the header flits 710 of the received packets 70 to an arbitration unit 300.

As illustrated in FIG. 1, each router 10 may further include an arbitration unit 300. Each arbitration unit 300 of the first exemplary embodiment controls operations of the whole of a router 10. In other words, an arbitration unit 300 is all the components remaining after excluding input/output control units 100 from a router 10.

Each arbitration unit 300 transfers (hereinafter, referred to as a routing transfer) each packet 70 from an input/output control unit 100 that has received the packet 70 to an input/output control unit 100 that is to transmit the packet 70 by a routing means (not illustrated) on the basis of results of the arbitration described earlier, for example. In the first exemplary embodiment, it is assumed that each arbitration unit 300 includes the routing means.

In other words, when receiving a header flit 710, each arbitration unit 300 performs a routing transfer corresponding to the header flit 710. That is, the arbitration unit 300 performs a routing transfer from an input/output control unit 100 that has received the header flit 710 to an input/output control unit 100 that corresponds to the transfer destination information included in the header flit 710.

Next, operation of an arbitration unit 300 when the arbitration unit 300 has received header flits 710 from respective ones of a plurality of input/output control units 100, will be described.

When input/output control units 100 that correspond to transfer destination information included in respective ones of the header flits 710 are all different from one another, the arbitration unit 300, with respect to each header flits 710, performs a routing transfer to an input/output control unit 100 that corresponds to transfer destination information included in the header flit 710.

When input/output control units 100 that correspond to transfer destination information included in respective ones of two or more header flits 710 are identical, the arbitration unit 300 operates as described below. The arbitration unit 300 performs a routing transfer to an input/output control unit 100 that corresponds to transfer destination information included in one header flit 710 among the header flits 710 including the transfer destination information to which the identical input/output control unit 100 corresponds. In this case, the arbitration unit 300 performs a routing transfer to an input/output control unit 100 that corresponds to transfer destination information included in a header flit 710 the lifetime of which contained in the lifetime field 711 takes the largest value among the header flits 710 including the transfer destination information to which the identical input/output control unit 100 corresponds.

In this case, the lifetime update unit 110 of each input/output control unit 100 adds a predetermined value to values in the lifetime fields 711 of packets 70 the transmission of which has been deferred (routing transfers have not been performed). The arbitration unit 300 and the lifetime update unit 110 repeat the above-described processing until no unprocessed header flit 710 is left.

The arbitration unit 300 may add the predetermined value to the values in the lifetime fields 711 of the packets 70 the transmission of which has been deferred. In this case, the input/output control units 100 do not have to include the lifetime update units 110.

Next, as a specific example, variation in latency in arbitration based on a general round-robin scheduling method and arbitration based on the first exemplary embodiment will be described.

Figure 4:
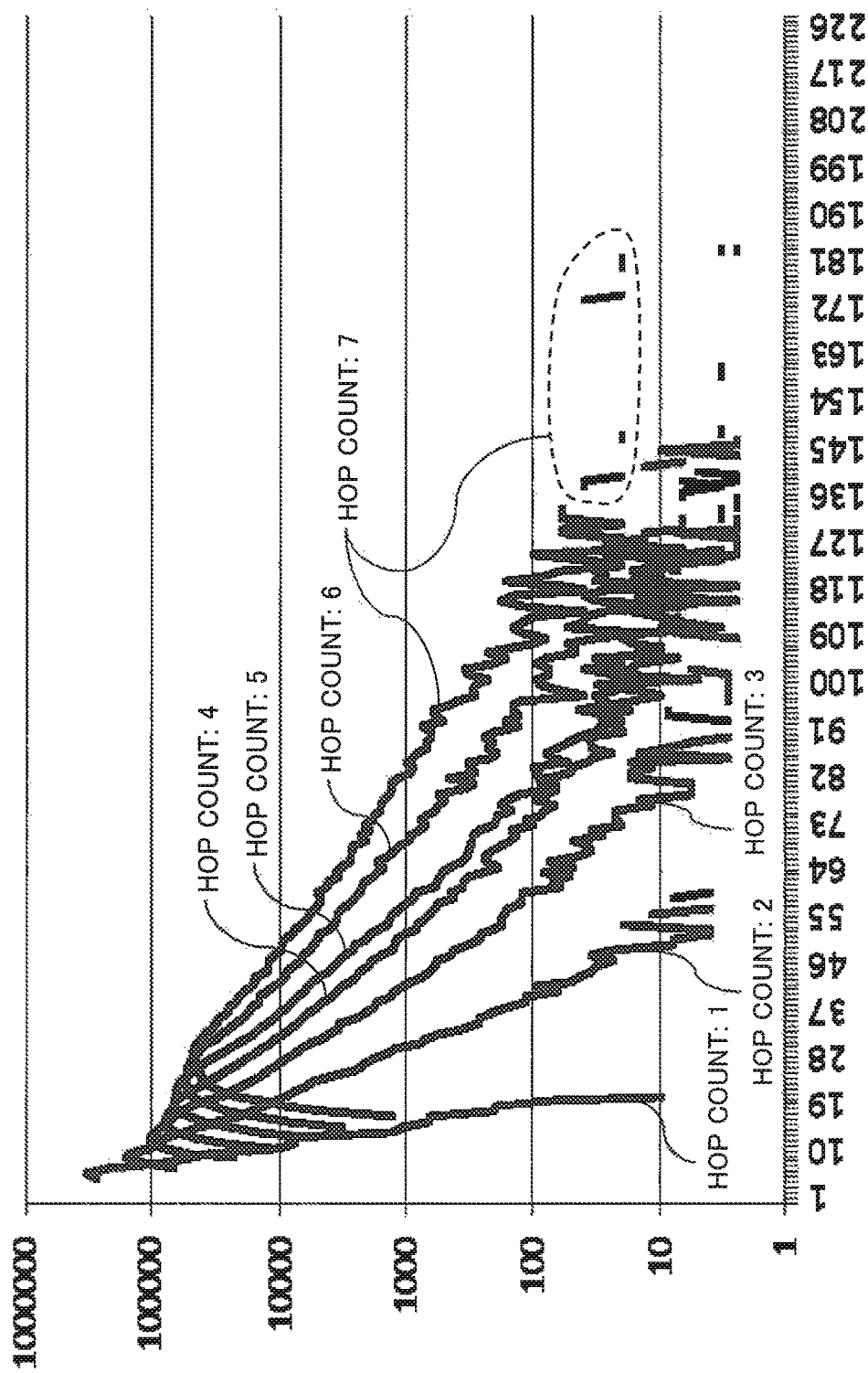
FIG. 4 is a diagram illustrating a result of simulation on variation in latency in arbitration based on a general round-robin scheduling method.

FIG. 4 is a diagram illustrating results of simulation on variation in latency in an arbitration based on a general round-robin scheduling method. FIG. 4 illustrates latency distributions with respect to each hop count when a million requests are issued. In FIG. 4, the vertical axis represents the number of requests, and the horizontal axis represents latency. In FIG. 4, for example, when the hop count is 7, while a peak in the number of requests (pieces of transfer data) is present at a latency value of approximately 30, requests with latency values in a range from 100 to 200 also exist.

Figure 5:
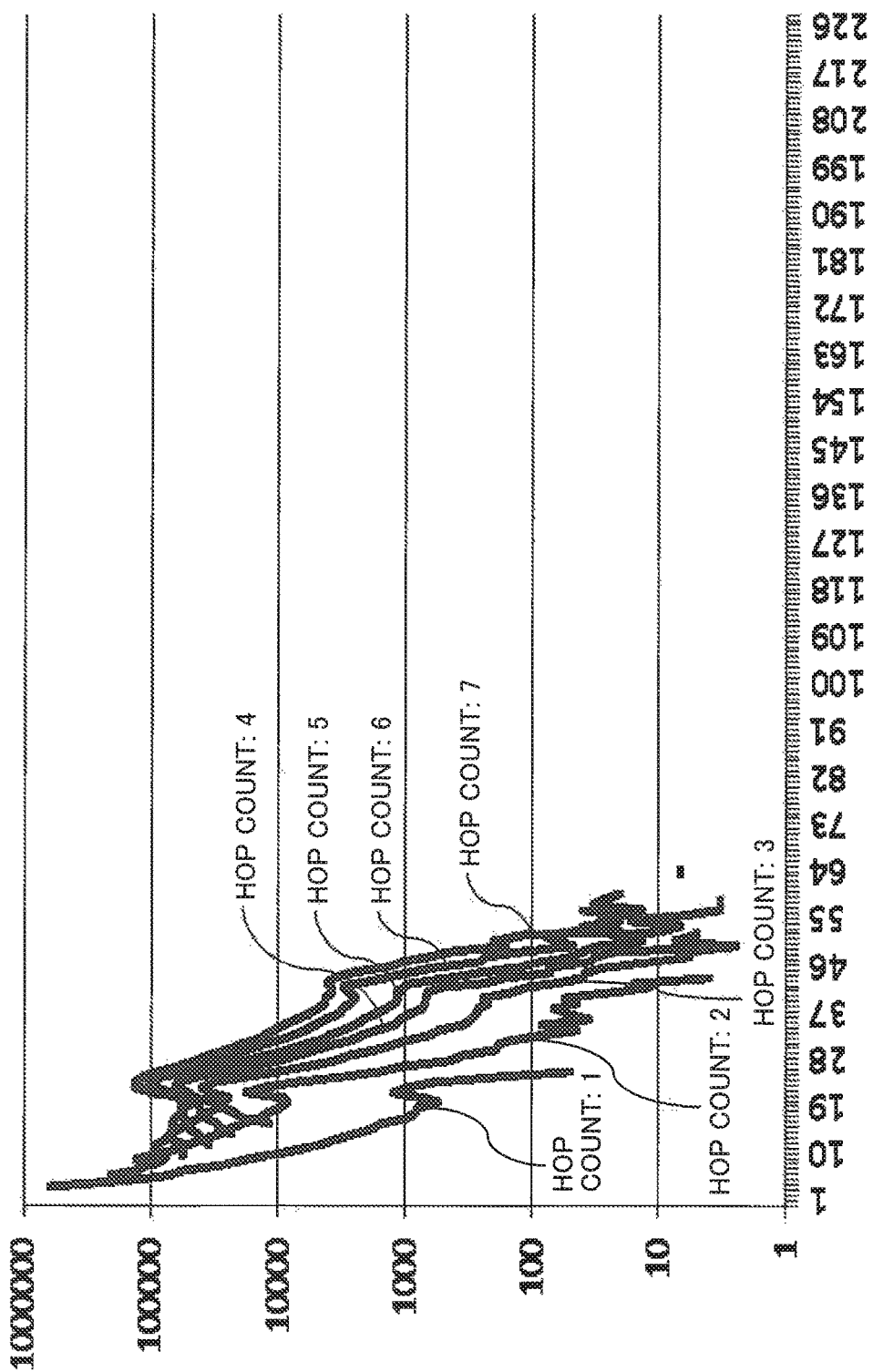
FIG. 5 is a diagram illustrating a result of simulation on variation in latency in the first exemplary embodiment.

FIG. 5 is a diagram illustrating results of simulation on variation in latency in the first exemplary embodiment. FIG. 5 illustrates latency distributions with respect to each hop count when a million requests are issued. In FIG. 5, the vertical axis represents the number of requests, and the horizontal axis represents latency. In FIG. 5, when the hop count is 7, a peak in the number of requests (pieces of transfer data) is present at a latency value of 25, and the largest latency value is controlled to approximately 64.

An advantageous effect in the above-described first exemplary embodiment is that a reduction in variation in latency and throughput of packet transfers (transfers of packets 70 from a module 40 to another module 40) can be achieved with a smaller amount of hardware.

That is because when modules 40 transmit packets 70 including lifetimes and competition between the packets 70 occurs, a router 10 transmits a packet 70 including a largest lifetime and updates the lifetimes of packets 70 the transmission of which is deferred.

<<<Second Exemplary Embodiment>>>

Next, a detailed explanation will be given for a second exemplary embodiment of the present invention with reference to the drawings. Hereinafter, descriptions of portions overlapping the earlier description will be omitted within a range not to obscure the description of the second exemplary embodiment.

Figure 6:
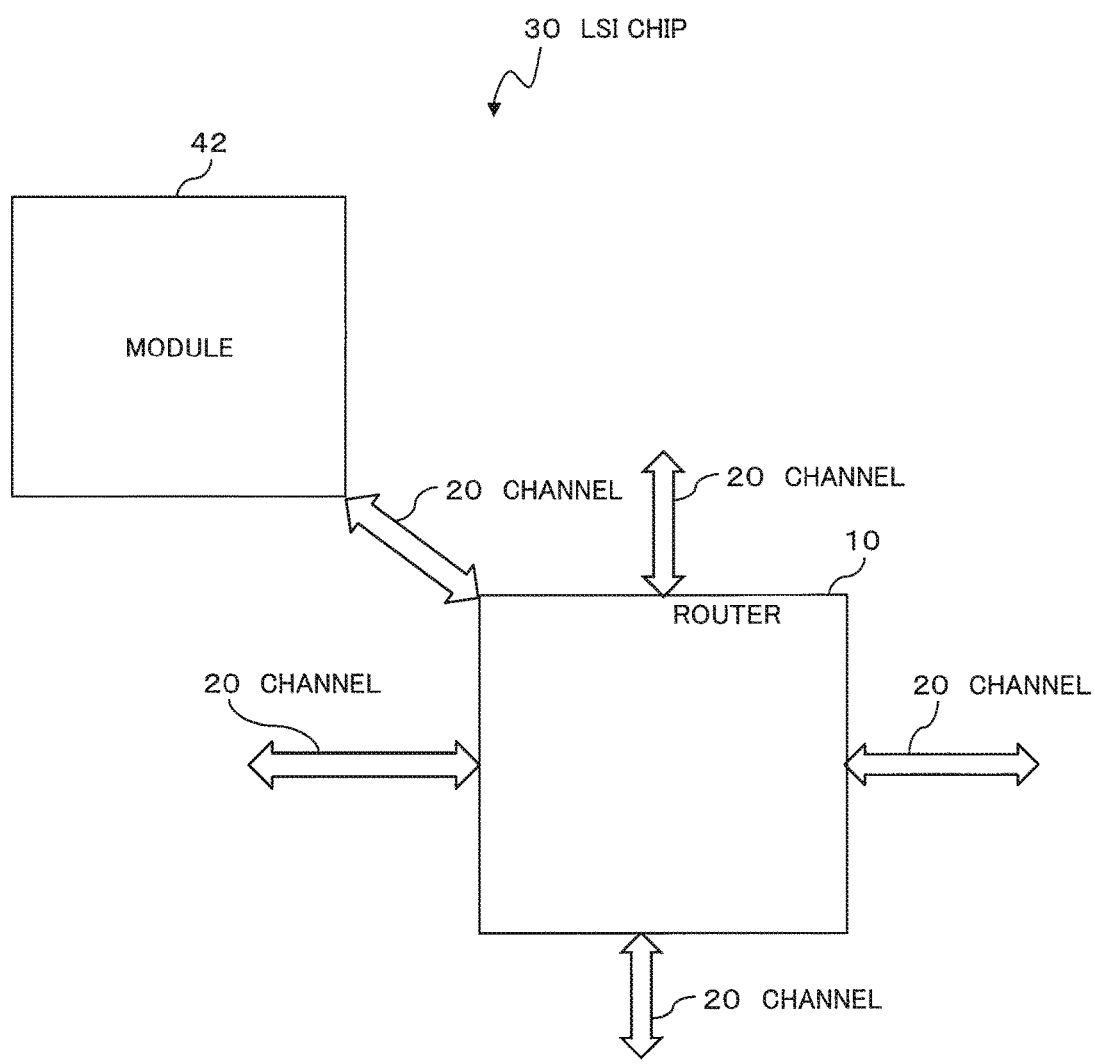
FIG. 6 is a block diagram illustrating a basic configuration of an LSI chip according to a second exemplary embodiment of the present invention.

FIG. 6 is a block diagram illustrating a basic configuration of an LSI chip 30 according to the second exemplary embodiment of the present invention.

As illustrated in FIG. 6, the LSI chip 30 according to the second exemplary embodiment differs from the LSI chip 30 of the first exemplary embodiment in that modules 42 are included in place of the modules 40.

Each module 42 transmits packets 70 each of which includes a largest lifetime value among possible lifetime values included in the packet 70. For example, the largest lifetime value is a value corresponding to a hop count to a module 42 that is a transfer destination. Specifically, the lifetime may be the hop count itself or a value smaller or larger than the hop count by an arbitrary number. Alternatively, the lifetime may be a value obtained by multiplying the hop count by an arbitrary value.

An advantageous effect in the above-described second exemplary embodiment is that a further reduction in variation in latency and throughput in packet transfers can be achived.

That is because modules 42 transmit packets 70 each of which includes a largest value as a lifetime.

<<<First Variation of Second Exemplary Embodiment>>>

In of a first variation of the second exemplary embodiment, each module 42 transmits packets 70 each of which includesa value obtained by adding a predetermined read additional value to the afore-described largest value as a lifetime when the packets 70 are read requests. For example, the read additional value may be the same as the predefined value. That is, the lifetime is a value corresponding to a hop count when a read request packet 70 is transferred and a hop count when a read data packet 70 that is a response to the read request is transferred. Specifically, the lifetime may be a multiple of a hop count to a module 42 that is a transfer destination or a value smaller or larger than a multiple of the hop count by an arbitrary number. The lifetime may be a value obtained by multiplying the hop count by an arbitrary value.

An advantageous effect in the above-described first variation of the second exemplary embodiment is that a further reduction in variation in latency and throughput in packet transfers can be achieved when packets 70 are read requests.

That is because each module 42 transmits packets 70 each of which includes, as a lifetime, a value obtained by adding a read additional value to a largest value.

<<<Second Variation of Second Exemplary Embodiment>>>

In a second variation of the second exemplary embodiment, each module 42 transmits packets 70 each of which includes a value obtained by adding the predetermined read additional value and a response additional value to the afore-described largest value as a lifetime when the packets 70 are responses to read requests. For example, the response additional value is a value corresponding to a time required to generate a packet 70 that is a response to the read request. Specifically, the response additional value may be a value in the unit of lifetime into which the time required to generate the packet 70 is converted or a value smaller or larger than the converted value by an arbitrary number.

An advantageous effect in the above-described second variation of the second exemplary embodiment is that a further reduction in variation in latency and throughput in packet transfers can be achieved when packets 70 are read requests.

That is because each module 42 transmits packets 70 each of which includes, as a lifetime, a value obtained by adding a read additional value and a response additional value to the afore-described largest value.

The LSI chips 30 described in the above exemplary embodiments and the variations of the respective exemplary embodiments are provided in various forms as described below.

Figure 7:
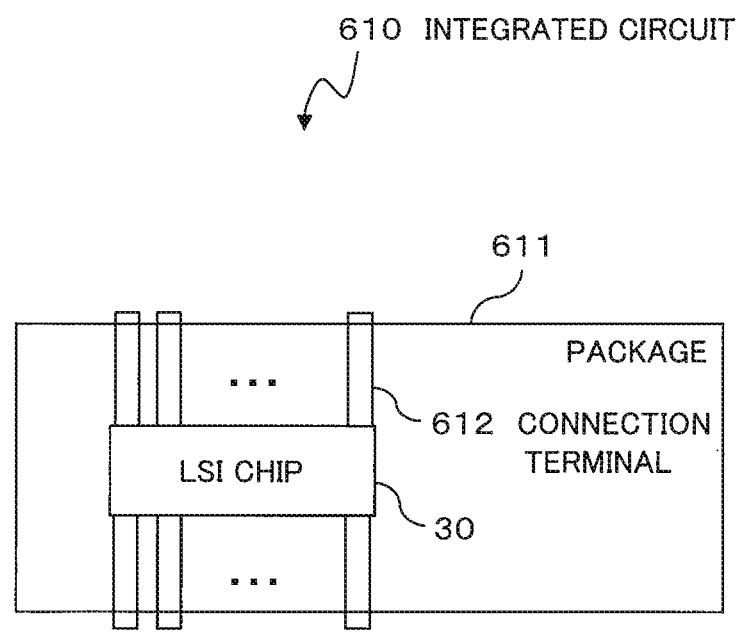
FIG. 7 is a block diagram illustrating an example of an integrated circuit that includes the LSI chip according to the respective exemplary embodiments.

FIG. 7 is a block diagram illustrating an example of an integrated circuit (also referred to as a chip set) 610 that includes an LSI chip 30. As illustrated in FIG. 7, the integrated circuit 610 includes the LSI chip 30, a package 611 on which the LSI chip 30 is mounted, and connection terminals 612 that are connected to input/output terminals or the like of the LSI chip 30 and extend to the exterior of the package 611.

Figure 8:
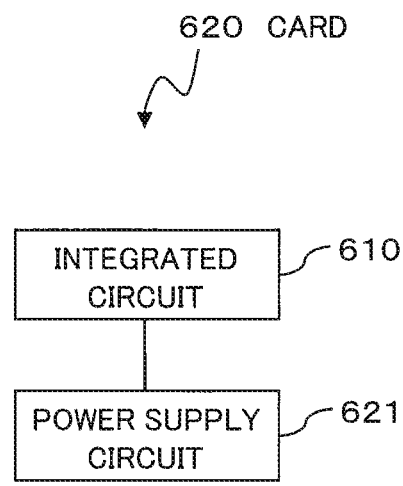
FIG. 8 is a block diagram illustrating an example of a card that includes the integrated circuit including the LSI chip according to the respective exemplary embodiments.

FIG. 8 is a block diagram illustrating an example of a card 620 that includes the integrated circuit 610. As illustrated in FIG. 8, the card 620 includes the integrated circuit 610 and a power supply circuit 621 that supplies power to the integrated circuit 610. As an example, the integrated circuit 610 and the power supply circuit 621 are mounted on a not-illustrated board.

Figure 9:
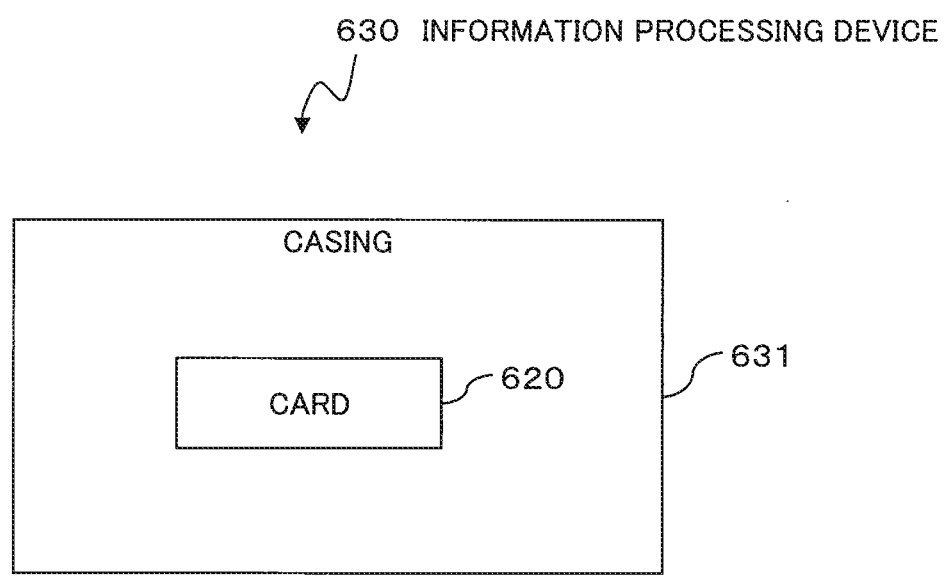
FIG. 9 is a block diagram illustrating an example of an information processing device that includes the card including the integrated circuit including the LSI chip according to the respective exemplary embodiments.

FIG. 9 is a block diagram illustrating an example of an information processing device 630 that includes the card 620. As illustrated in FIG. 9, the information processing device 630 includes the card 620 and a casing 631 on which the card 620 is mounted.

FIG. 10 is a block diagram illustrating an example of an information processing system 640 that includes the information processing device 630. As illustrated in FIG. 10, the information processing system 640 includes the information processing device 630 and an information processing device 642 that is connected by a network 641. The network 641 may be an arbitrary network. The information processing device 642 may be an arbitrary information processing device.

For a network-on-chip, achieving the following two points at the same time is expected. The first point is that variation in latency and throughput in packet transfers within the chip is as small as possible. The second point is that the area that a router occupies in the chip is as small as possible. This is because the variation and area are overheads in a layout of a network-on-chip. The "packet transfers within the chip" are packet transfers from a module (an integrated processor block in PTL3) to another module within the network-on-chip.

However, the technologies disclosed in the above-described cited literature have a problem in that it is difficult to reduce variation in latency and throughput in packet transfers within the chip while controlling increase in the area that a router occupies.

The reason for the problem is as follows.

In the technologies disclosed in respective ones of PTL1 and PTL2, the amount of hardware increases because of complicated logic. In consequence, a problem in that the area of a router becomes large is caused.

On the other hand, the arbitration based on a round-robin scheduling method keeps impartiality of arbitration in the order of priority within each router. However, when packets are transferred through a plurality of routers, impartiality across the whole of the plurality of routers is not assured. In other words, there can be a case in which a result of arbitration with respect to each plurality of routers is biased towards either a lower or higher order of priority than the order of priority the packets have. In consequence, there is a problem that variation is caused in latency and throughput of respective packets which are transferred through a plurality of routers.

With the exemplary embodiments of the present invention as described above, it becomes possible to achieve a reduction in variation in latency and throughput in packet transfers with a smaller amount of hardware more appropriately.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

What is claim is:

1. A semiconductor chip, comprising:
modules configured to transmit transfer data, the transfer data including a lifetime corresponding to a time required to transfer the transfer data to a destination;
routers including a plurality of input/output controller configured to receive and transmit the transfer data, the routers being configured to add a predetermined value to the lifetime included in deferred transfer data, transmission of the deferred transfer data being deferred as a result of arbitration for transmitting the transfer data having a largest lifetime among a plurality of the transfer data competing for one of the input/output controller; and
channels configured to connect one of the modules to one of the routers, or to connect one of the routers to an adjacent router,
wherein the modules transmit the transfer data each of which includes the lifetime that is a largest value among possible values of the lifetime included in a piece of transfer data,
wherein the modules transmit the transfer data each of which includes the lifetime that is a value obtained by adding, to the largest value, a read additional value and a response additional value corresponding to a time required to generate transfer data as the response when the transfer data are responses to read requests,
and wherein the largest value of the lifetime is determined based on a value corresponding to a hop count of the transfer data until the transfer data reaches the destination.

2. The semiconductor chip according to claim 1, wherein the modules transmit the transfer data each of which includes the lifetime that is a value obtained by adding a predetermined read additional value to the largest value when the transfer data are read requests.

3. The semiconductor chip according to claim 2, wherein the modules transmit the transfer data each of which includes the lifetime that is a value obtained by adding, to the largest value, a read additional value and a response additional value corresponding to a time required to generate transfer data as the response when the transfer data are responses to the read requests.

4. An integrated circuit, comprising:
a semiconductor chip according to claim 1;
a package on which the semiconductor chip is mounted; and
connection terminals that are connected to the semiconductor chip and extend to the exterior of the package.

5. A card, comprising:
an integrated circuit including a semiconductor chip according to claim 1; and
a circuit configured to supply power to the integrated circuit.

6. An information processing device, comprising:
a card according to claim 5; and
a casing configured to contain the card.

7. A data transfer method by which routers including a plurality of input/output controller execute:
receiving transfer data each of which includes a lifetime that corresponds to a time required to transfer a piece of transfer data to a destination, the transfer data having been transmitted by modules; and
adding a predetermined value to the lifetime included in deferred transfer data, transmission of the deferred transfer data being deferred as a result of arbitration for transmitting the transfer data having a largest lifetime among a plurality of transfer data for one of the input/output controller,
wherein each of the transfer data includes the lifetime that is a largest value among possible values of the lifetime included in the piece of transfer data,
wherein each of the transfer data includes the lifetime that is a value obtained by adding, to the largest value, a read additional value and a response additional value corresponding to a time required to generate transfer data as the response when the transfer data are responses to read requests,
and wherein the largest value of the lifetime is determined based on a value corresponding to a hop count of the transfer data until the transfer data reaches the destination.

* * * * *